(12) United States Patent
Nagareda et al.

(10) Patent No.: US 12,253,599 B2
(45) Date of Patent: Mar. 18, 2025

(54) ATTACHMENT FOR ULTRASONIC-WAVE TRANSMITTER/RECEIVER

(71) Applicant: HONDA ELECTRONICS CO., LTD., Aichi (JP)

(72) Inventors: Kenji Nagareda, Aichi (JP); Shuichi Sano, Aichi (JP); Kimihiro Kusuno, Aichi (JP); Shigeo Yamamoto, Aichi (JP)

(73) Assignee: HONDA ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 17/915,715

(22) PCT Filed: Dec. 22, 2021

(86) PCT No.: PCT/JP2021/047559
§ 371 (c)(1),
(2) Date: Sep. 29, 2022

(87) PCT Pub. No.: WO2023/119480
PCT Pub. Date: Jun. 29, 2023

(65) Prior Publication Data
US 2024/0210562 A1    Jun. 27, 2024

(51) Int. Cl.
*G01S 15/96*   (2006.01)
*G01S 7/521*   (2006.01)

(52) U.S. Cl.
CPC .............. *G01S 15/96* (2013.01); *G01S 7/521* (2013.01)

(58) Field of Classification Search
CPC .................................. G01S 15/96; G01S 7/521
See application file for complete search history.

(56) References Cited

U.S. PATENT DOCUMENTS

| 4,065,748 A | 12/1977 | Pierre et al. |
| 5,173,882 A * | 12/1992 | Watson ................ G10K 11/355 367/104 |

(Continued)

FOREIGN PATENT DOCUMENTS

| JP | 59-085972 | 5/1984 |
| JP | 02-025885 | 2/1990 |

(Continued)

OTHER PUBLICATIONS

WO-2021106138-A1 (machine translation) (Year: 2021).*

*Primary Examiner* — Luke D Ratcliffe
*Assistant Examiner* — Christopher Richard Walker
(74) *Attorney, Agent, or Firm* — Millen, White, Zelano & Branigan, P.C.; Christopher W. Brody (57) ABSTRACT

The present invention provides an attachment for an ultrasonic-wave transmitter/receiver that can be used by changing directivity characteristics according to the situation, even if there is only one ultrasonic-wave transmitter/receiver. The attachment 60 to be attached to the ultrasonic-wave transmitter/receiver 10 comprises an acoustic lens 81, a holding member 61, and horizontal maintenance means 71. The acoustic lens 81 has a flat surface 82 and a convex surface 83 located on the opposite side. The holding member 61 holds the acoustic lens 81 with the flat surface 82 facing upward as well as detachably holds the ultrasonic transducer 10, so as to acoustically connect the acoustic radiation surface 10a to the flat surface 82. The horizontality-maintaining means 71 horizontally maintains the ultrasonic-wave transmitter/receive 10 and the acoustic lens 81.

5 Claims, 9 Drawing Sheets

(56) References Cited

U.S. PATENT DOCUMENTS

| | | | |
|---|---|---|---|
| 5,184,414 | A | 2/1993 | James |
| 5,546,362 | A | 8/1996 | Steven et al. |
| 5,887,376 | A | 3/1999 | Jon et al. |
| 7,746,727 | B2 | 6/2010 | John et al. |
| 10,712,436 | B2* | 7/2020 | Lebedev ................. G01S 7/521 |
| 2006/0050615 | A1 | 3/2006 | Steven |
| 2013/0215719 | A1* | 8/2013 | Betts ....................... G01S 15/89 |
| | | | 367/88 |
| 2018/0033417 | A1* | 2/2018 | Antao .................... G01D 11/30 |
| 2021/0173061 | A1* | 6/2021 | Fyler ....................... G01S 7/521 |
| 2021/0364636 | A1* | 11/2021 | Simonton ............... G01S 7/521 |

FOREIGN PATENT DOCUMENTS

| | | | |
|---|---|---|---|
| JP | 05-212355 | 8/1993 | |
| JP | 09-298795 | 11/1997 | |
| JP | 10-179582 | 7/1998 | |
| JP | 2001-169393 | 6/2001 | |
| JP | 2002-044773 | 2/2002 | |
| WO | WO-2021106138 A1 * | 6/2021 | ............ G01S 15/96 |

\* cited by examiner

ATTACHMENT FOR ULTRASONIC-WAVE TRANSMITTER/RECEIVER

TECHNICAL FIELD

The present invention relates to an attachment to be attached to an ultrasonic-wave transmitter/receiver.

TECHNICAL BACKGROUND

There is a conventionally known ultrasonic wave transmitter/receiver housing an ultrasonic transducer, suspended by a cable for signal transmission and dropped into the water so that the ultrasonic transducer transmits and receives ultrasonic waves, thus detecting any school of fish present. This ultrasonic-wave transmitter/receiver is used, e.g., for ice fishing such as lake-smelt fishing. The ultrasonic-wave transmitter/receiver is to be inserted into the water through a hole made in the ice when ice fishing.

Incidentally, there is a demand to adjust (change) the directivity characteristics of the ultrasonic waves irradiated from the ultrasonic transducer. Conventionally, it has been proposed to use an acoustic lens having a convex or a concave surface (see, for example, Patent Documents 1 to 5) as a member that changes the directivity characteristics of ultrasonic waves.

PRIOR ARTS

Patent Documents

Patent Document 1: Japanese Unexamined Patent Application Publication No. S59-85972 (FIGS. 2, 5, 6, etc.)
Patent Document 2: Japanese Unexamined Patent Application Publication No. H5-212355 (claim 2, Paragraphs and [0023], FIGS. 1, 2, etc.)
Patent Document 3: Japanese Unexamined Patent Application Publication No. H10-179582 (Paragraph [0017], FIG. 1, etc.)
Patent Document 4: Japanese Unexamined Patent Application Publication No. 2001-169393 (claims 1, 3, and 4, Paragraphs and [0016], FIGS. 1, 4, etc.)
Patent Document 5: Japanese Unexamined Patent Application Publication No. H9-298795 (claim 3, Paragraphs and [0037], FIGS. 6 to 8, etc.)

DISCLOSURE OF THE INVENTION

Problems to be Solved by the Invention

However, according to the prior arts described in Patent Documents 1 to 5, an acoustic lens is directly attached to the ultrasonic transducer. In that case, there is a problem that even if the situation changes, the directivity characteristics of ultrasonic waves cannot be changed to other different directivity characteristics.

Further, to improve the detection accuracy of the ultrasonic-wave transmitter/receiver, it is preferable to irradiate (transmit) ultrasonic waves vertically downward with the acoustic radiation surface of the ultrasonic-wave transmitter/receiver in a horizontal state. Conventionally, the acoustic radiation surface is horizontally maintained by the self-weight of the ultrasonic transmitter/receiver. However, the acoustic radiation surface is inclined when the ultrasonic-wave transmitter/receiver is inclined. Then, the direction of the irradiated ultrasonic waves is inclined in the vertical direction. In this case, since the school of fish cannot be detected accurately, there is a problem that an error occurs on the display of the fish finder.

The present invention has been achieved in view of the above problems. The first purpose thereof such an invention is to provide an attachment for an ultrasonic-wave transmitter/receiver, which can change the directivity characteristics according to the various situations, even if there is only one ultrasonic-wave transmitter/receiver. The second purpose is to provide an attachment for an ultrasonic-wave transmitter/receiver, which can keep the ultrasonic transmitter/receiver in a horizontal state to transmit the ultrasonic waves vertically downward, thus improving detection accuracy.

MODES FOR CARRYING OUT THE INVENTION

In order to solve the above problems, the first aspect of the present invention refers to an attachment to be attached to an ultrasonic-wave transmitter/receiver for a fish finder, which is suspended from a cable, housing a molded ultrasonic transducer for transmitting and receiving ultrasonic waves with the bottom surface as an acoustic radiation surface characterized in comprising: an acoustic lens having a flat surface and a convex surface located on the opposite side; a holding member to hold the acoustic lens with the flat surface facing upward and to detachably hold the ultrasonic-wave transmitter/receiver so that the acoustic radiation surface is acoustically connected to the flat surface of the acoustic lens; and a horizontality maintaining means to maintain the ultrasonic-wave transmitter/receiver and the acoustic lens horizontally.

According to the first aspect of the present invention, the ultrasonic-wave transmitter/receiver is detachably held by the holding member, and the acoustic lens is arranged on the acoustic radiation surface of the ultrasonic-wave transmitter/receiver held by the holding member. Therefore, even if there is only one ultrasonic-wave transmitter/receiver, it is possible to adjust the directivity characteristics of the ultrasonic waves irradiated from the acoustic radiation surface according to the situation. Specifically, holding the ultrasonic-wave transmitter/receiver by the holding member makes it possible to change the directivity characteristics of the ultrasonic waves through the acoustic lens. On the other hand, by removing the ultrasonic-wave transmitter/receiver from the holding member, the directivity characteristics of the ultrasonic waves can be changed to the original directivity. Also, since the ultrasonic-wave transmitter/receiver and the acoustic lens are horizontally maintained by the horizontality-maintaining means, the acoustic radiation surface of the ultrasonic-wave transmitter/receiver and the flat surface of the acoustic lens also become horizontal. As a result, the ultrasonic waves can be transmitted vertically downward so that the detection accuracy of the ultrasonic-wave transmitter/receiver is improved. The convex surface of the acoustic lens may be spherical, conical, or the like.

The second aspect of the present invention refers to an attachment for an ultrasonic-wave transmitter/receiver according to the first aspect of the present invention, characterized in that the horizontality-maintaining means is installed at an opening part of a hole provided in the ice so as to maintain the ultrasonic-wave transmitter/receiver and the acoustic lens horizontally.

According to the second aspect of the present invention, the horizontal state of the ultrasonic-wave transmitter/receiver and the acoustic lens held by the holding member can be easily maintained only by installing the horizontality-maintaining device in the opening part of the hole provided in the ice. In addition, since the horizontality-maintaining device is supported by solid ice, the horizontal state of the ultrasonic-wave transmitter/receiver and the acoustic lens can be stably maintained.

The third aspect of the present invention refers to an attachment for an ultrasonic-wave transmitter/receiver according to the second aspect of the present invention, characterized in that the horizontality-maintaining device is composed of a frame body having a plurality of side portions, wherein a rod-shaped member connecting the horizontality maintaining device to the holding member is arranged at a position that deviates from the center of the frame body, with the holding member arranged inside the frame body.

According to the third aspect of the present invention, since the horizontality-maintaining device is composed of a frame body having a plurality of side portions, the horizontality-maintaining device can be installed more stably at the opening part of the hole provided in the ice compared to the case where the horizontality-maintaining device is composed of, for example, one piece of the side portion. Also, since a rod-shaped member connecting the horizontality-maintaining device to the holding member is arranged at a position that deviates from the center of the frame body, the rod-shaped member does not become an obstacle while being attached to or detached from the holding member. Furthermore, since the holding member is arranged inside the frame body, the ultrasonic-wave transmitter/receiver inserted from the inside can be easily held by the holding member. The length of the diagonal line of the frame body is preferably longer than the inner diameter of the hole provided in the ice. As such, it is possible to prevent the horizontality-maintaining device from falling into the hole.

The fourth aspect of the present invention refers to an attachment for an ultrasonic-wave transmitter/receiver according to the second or the third aspect of the present invention, characterized in that the horizontality-maintaining device is composed of a frame body having an even number of sides of four or more, and is foldable.

According to the fourth aspect of the present invention, the horizontality-maintaining device (frame body) can be compactly folded and easily carried.

The fifth aspect of the present invention refers to an attachment for an ultrasonic-wave transmitter/receiver according to the first aspect of the present invention, characterized in that the horizontality-maintaining means is provided so as to surround the holding member from the outer peripheral side, which is made of a material having a specific gravity smaller than that of water and is a buoyant body that horizontally maintains the ultrasonic-wave transmitter/receiver and the acoustic lens by a buoyancy acting on itself.

According to the fifth aspect of the present invention, since the horizontality-maintaining means is a buoyant body provided so as to surround the holding member from the outer peripheral side, the buoyant force acts evenly on the holding member, thus making it easy to prevent the holding member from being inclined. As a result, the balanced state of the ultrasonic-wave transmitter/receiver and the acoustic lens held by the holding member in water can be quickly stabilized so that the acoustic radiation surface of the ultrasonic-wave transmitter/receiver and the flat surface of the acoustic lens securely become horizontal. Therefore, the detection accuracy of the ultrasonic-wave transmitter/receiver is easily improved.

The sixth aspect of the present invention refers to an attachment for an ultrasonic-wave transmitter/receiver according to any one of the first to fifth aspects of the present invention, characterized in that the acoustic lens is detachably held to the holding member and is selected from among various types of acoustic lenses having at least either of dimensions or shape different from each other.

According to the sixth aspect of the present invention, even if there is only one ultrasonic-wave transmitter/receiver, it is possible to change the directivity characteristics of the ultrasonic waves according to the situation, while the acoustic lens selected from various types of acoustic lenses is being held by the holding member.

The seventh aspect of the present invention refers to an attachment for an ultrasonic-wave transmitter/receiver according to any one of the first to sixth aspects of the present invention, characterized in that a fitting hole is provided on the bottom portion of the holding member so that the convex surface side of the acoustic lens with the flat surface facing upward is fitted and projected downward from the bottom surface of the holding member, wherein the fitting hole has a shape of which the inner diameter gradually increases as it goes up.

According to the seventh aspect of the present invention, since the acoustic lens is held by the holding member in a state where a part of the convex surface is in surface contact with the inner surface of the fitting hole, the ultrasonic-wave transmitter/receiver is easily placed in the fitting hole.

The eighth aspect of the present invention refers to an attachment for an ultrasonic-wave transmitter/receiver according to any one of the first to sixth aspects of the present invention, characterized in that a fitting hole is provided on the bottom portion of the holding member so that the convex surface side of the acoustic lens with the flat surface facing upward is fitted thereinto and projected downward from the bottom surface of the holding member, comprising a mounting fixture which is fixed on the inner peripheral surface of the holding member to press the flat surface of the acoustic lens fitted into the fitting hole.

According to the eighth aspect of the present invention, since the acoustic lens is fixed in a state of being inserted between the bottom portion of the holding member and the mounting fixture, the acoustic lens can be securely fixed and held. Therefore, it is possible to solve the problem that the acoustic lens sticks to the ultrasonic-wave transmitter/receiver and falls into the water when the ultrasonic-wave transmitter/receiver is pulled up.

The ninth aspect of the present invention refers to an attachment for an ultrasonic-wave transmitter/receiver according to any one of the first to sixth aspects of the present invention, characterized by comprising: a fitting hole provided on the bottom portion of the holding member so that the convex surface side of the acoustic lens with the flat surface facing upward is fitted thereinto and protruded downward from the bottom surface of the holding member; and a water supply/discharge hole for supplying water into the holding member and discharging water from the holding member, wherein the water supply/discharge hole is formed by widening a part of the fitting hole to acoustically connect the acoustic radiation surface of the ultrasonic-wave transmitter/receiver to the flat surface of the acoustic lens via water.

According to the ninth aspect of the present invention, when the attachment attached to the ultrasonic-wave transmitter/receiver is immersed in water, water is supplied into the holding member through the water supply/discharge hole. It then enters between the acoustic radiation surface of the ultrasonic-wave transmitter/receiver and the flat surface of the acoustic lens. As a result, since the ultrasonic-wave transmitter/receiver and the acoustic lens can be used in close contact with each other through the water as a coupling material, the directivity characteristics of ultrasonic waves are to be wider than the original directivity characteristics. Moreover, when the attachment is pulled up from the water, water can be smoothly discharged to the holding member through the water supply/discharge hole.

The 10th aspect of the present invention refers to an attachment according to any one of the first to ninth aspects of the present invention, characterized in that a groove extending in the circumferential direction of the ultrasonic-wave transmitter/receiver is formed on the outer peripheral surface of the ultrasonic-wave transmitter/receiver, wherein a fastening member passing through the holding member is fitted into the groove.

According to the tenth aspect of the present invention, it is possible to prevent the ultrasonic-wave transmitter/receiver and the acoustic lens located on the lower side from coming off while the fastening member is being fitted into the groove, thus making it possible to securely fix and hold the ultrasonic-wave transmitter/receiver and the acoustic lens.

Effects of the Invention

As described in detail above, according to the first to 10th aspects of the present invention, even if there is only one ultrasonic-wave transmitter/receiver, it can be used by changing directivity characteristics variously depending on the situation. Also, by keeping the ultrasonic-wave transmitter/receiver horizontal, the ultrasonic waves are transmitted vertically downward, thus making it possible to improve the detection accuracy of the ultrasonic-wave transmitter/receiver.

BRIEF DESCRIPTION OF THE DRAWINGS

FIG. 13 (a) is the plan view showing the positional relationship between the holding member and the horizontality-maintaining device according to another embodiment, and FIG. 13 (b) is the explanatory view showing a method for folding the horizontality-maintaining device.

MODES FOR CARRYING OUT THE INVENTION

First Embodiment

Hereinafter, the first embodiment specifying the present invention will be described in detail with reference to the drawings.

Figure 1:
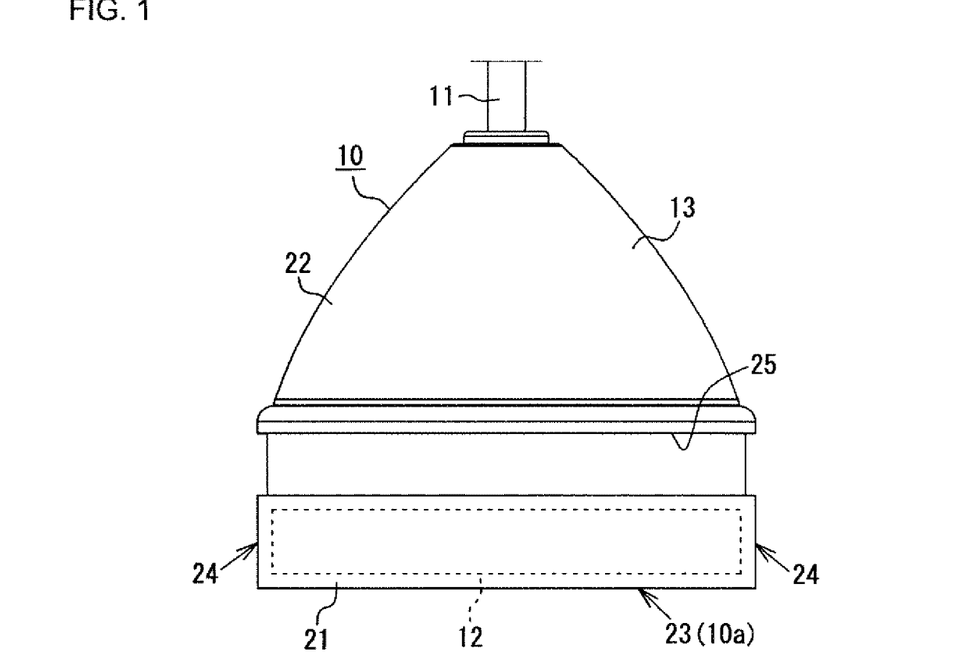
FIG. 1 is the side view showing an ultrasonic-wave transmitter/receiver of the present invention.

As shown in FIG. 1, the ultrasonic-wave transmitter/receiver 10 of the present embodiment is a device for a fish finder that detects a school of fish existing in water by irradiating ultrasonic waves in water. The ultrasonic-wave transmitter/receiver 10 is used in a state of being suspended from a cable 11. Also, the ultrasonic-wave transmitter/receiver 10 includes an ultrasonic transducer 12 for transmitting/receiving ultrasonic waves, and a case 13 for housing the ultrasonic transducer 12 in a molded state. Since the ultrasonic transducer 12 of the present embodiment is a composite transducer having a piezoelectric element such as a 0-3 composite structure, a 1-3 composite structure, a 2-2 composite structure, or the like, the entire radiation surface has a relatively uniform phase.

Figure 10:
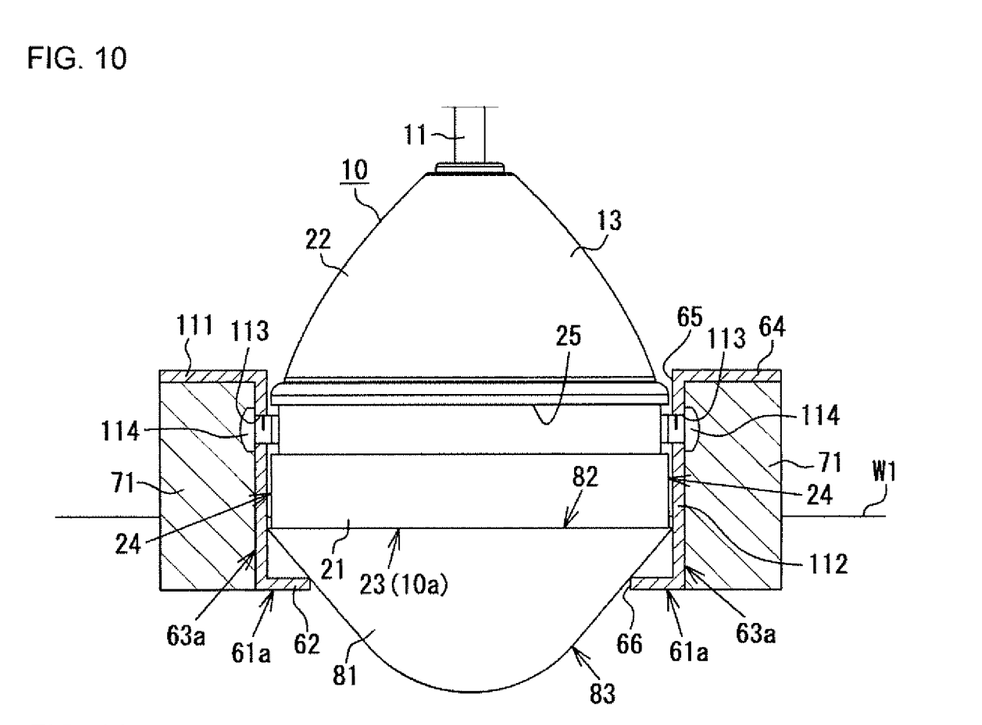
FIG. 10 is the cross-sectional view showing an attachment for an ultrasonic transducer according to another embodiment.

The case 13 has a bell shape, with a lower case 21 forming the lower half of the case 13 and an upper case 22 forming the upper half of the case 13. The lower case 21 is open at its upper end and has a bottom surface 23 and an outer peripheral surface 24 perpendicular to the bottom surface 23. The ultrasonic transducer 12 is housed inside the lower case 21. The outer diameter of the ultrasonic transducer 12 is slightly smaller than the outer diameter of the bottom surface 23. A bottom surface 23 of the lower case 21 is flat and functions as an acoustic radiation surface 10a for irradiating (transmitting) ultrasonic waves. Further, as shown in FIG. 10, a groove 25 is formed on the outer peripheral surface 24 of the lower case 21 so that a screw 114 or the like is fitted thereinto. The groove 25 having a rectangular cross-section extends along the circumferential direction of the cylindrical lower case 21 and is formed continuously over the entire circumference of the lower case 21.

As shown in FIG. 1, the upper case 22 has a shape that opens at the lower end and the outer diameter gradually decreases toward the upper end. A through hole (not shown) for inserting the cable 11 is provided at the upper end of the upper case 22.

Figure 2:
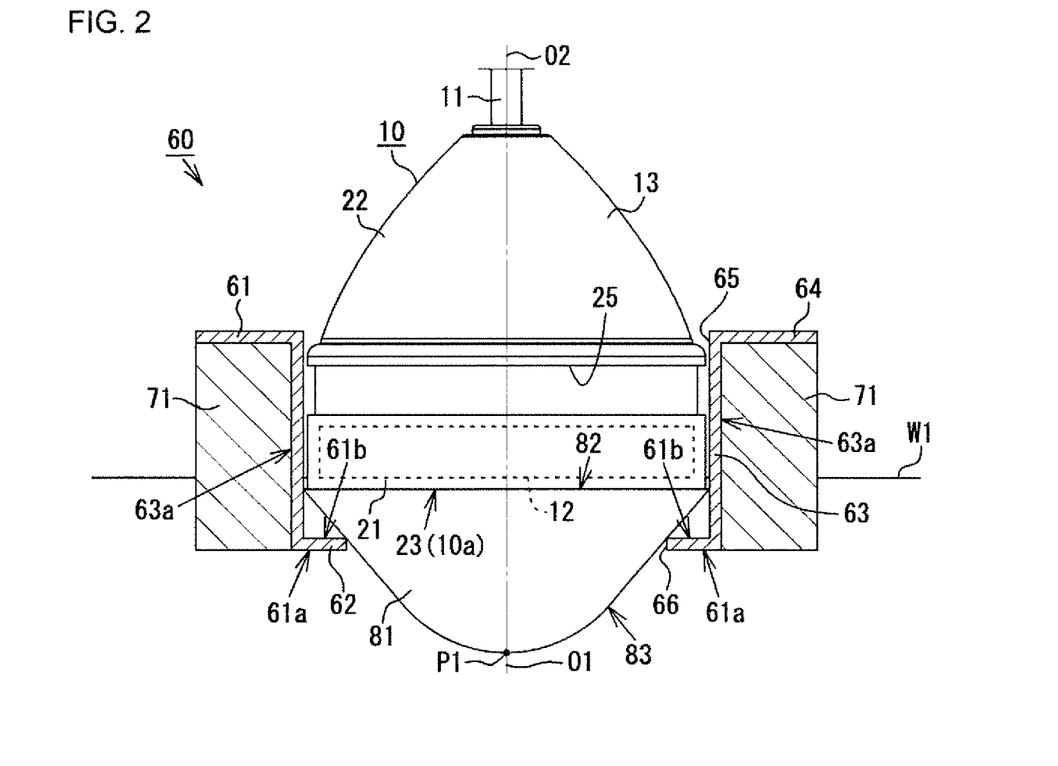
FIG. 2 is the cross-sectional view showing an attachment for an ultrasonic-wave transmitter/receiver according to the first embodiment.
Figure 3:
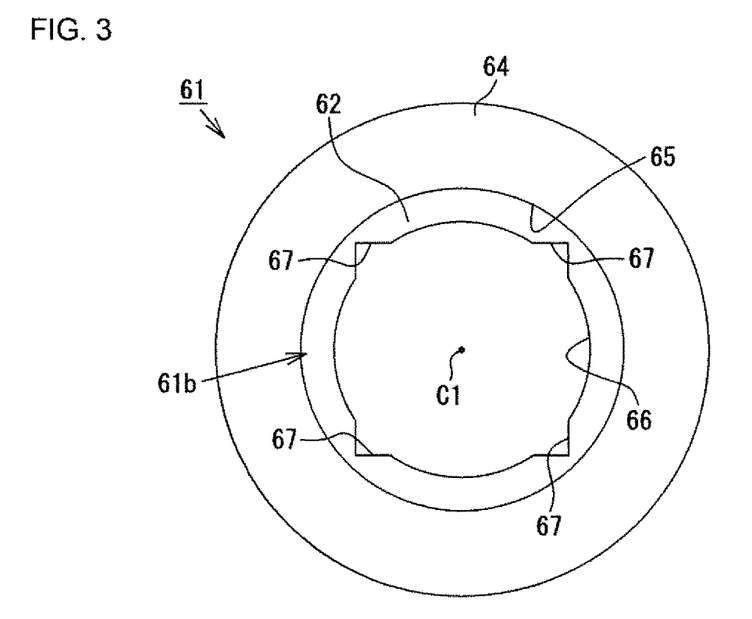
FIG. 3 is the plan view showing a holding member according to the first embodiment.

In addition, the ultrasonic wave transmitter/receiver 10 of the present embodiment is used in a state of being suspended from the cable 11 during normal use (see FIG. 1). However, the ultrasonic-wave transmitter/receiver 10 can also be used in a state where an attachment 60 (see FIG. 2) is attached thereto. Specifically, the attachment 60 includes an acoustic lens 81, a holding member 61, and a buoyancy body 71 (horizontality-maintaining means). As shown in FIGS. 2 and 3, the holding member 61 is a substantially cylindrical member made of a resin material such as ABS resin or the like. It is configured in a cup shape with a bottom portion 62, a cylindrical portion 63, and an upper-end portion 64. The holding member 61 detachably holds the ultrasonic-wave transmitter/receiver 10 so that the acoustic radiation surface 10a is acoustically connected to the flat surface 82 of the acoustic lens 81. A space formed by the bottom portion 62 and the cylindrical portion 63 becomes a holding recess 65 to hold the ultrasonic wave transmitter/receiver 10. The inner diameter of the holding recess 65 (cylindrical portion 63) is slightly greater than the outer diameter of the ultrasonic-wave transmitter/receiver 10.

In addition, one fitting hole 66 is provided on the bottom portion 62 of the holding member 61. The fitting hole 66 has a circular shape and is provided in the center of the bottom portion 62. The fitting hole 66 is for fitting the convex surface 83 of the acoustic lens 81 with the flat surface 82 facing up and further projecting downward from the bottom surface 61a (see FIG. 2) of the holding member 61. At this time, the outer peripheral portion of the acoustic lens 81 is supported from underneath by the bottom portion 62. Also, the acoustic lens 81 is detachably held to the holding member 61. Further, four water supply/discharge holes 67 are formed by widening a part of the fitting hole 66. Each water supply/discharge hole 67 has a corner portion on the outer peripheral side of the bottom portion 62. The water supply/discharge holes 67 are arranged at equal angular intervals (90-degree intervals) on the basis of the center C1 (see FIG. 3) of the fitting hole 66. Each water supply/discharge hole 67 is for supplying water into the holding recess 65 and discharging the water in the holding recess 65 to the outside of the holding member 61.

As shown in FIG. 2, the buoyant body 71 is provided so as to surround the holding member 61 from the outer peripheral side. Specifically, the buoyant body 71 is attached to surround the outer wall surface 63a of the cylindrical portion 63 by winding a strip-shaped sponge around the entire outer wall surface 63a. The buoyant body 71 is made of a material having a specific gravity smaller than that of water, such as polystyrene foam, polyethylene foam, polyurethane foam, or the like. The buoyant body 71 horizontally maintains the holding member 61, the ultrasonic-wave transmitter/receiver 10, and the acoustic lens 81 by the buoyant force acting on itself. The buoyant body 71 has a buoyancy that is efficient to let the water surface W1 reach the flat surface 82 of the acoustic lens 81, while the ultrasonic-wave transmitter/receiver 10 is not being held in the holding recess 65.

Also, the acoustic lens 81 is a substantially conical member made of urethane resin. On the other hand, the portion of the acoustic radiation surface 10a of the ultrasonic-wave transmitter/receiver 10 is made of a molding material such as rubber, urethane resin, or the like. Therefore, the characteristic acoustic impedance of the acoustic lens 81 is substantially equal to the characteristic acoustic impedance of the molding material. The acoustic velocity of ultrasonic waves propagating in the acoustic lens 81 is different from the acoustic velocity of ultrasonic waves propagating through the water.

The acoustic lens 81 also has a flat surface 82 and a convex surface 83 located on the opposite side. The outer diameter of the flat surface 82 is greater than the outer diameter of the fitting hole 66 and is equal to the outer diameter of the acoustic radiation surface 10a. Thus, the area of the flat surface 82 is equal to that of the acoustic radiation surface 10a. Furthermore, the outer diameter of the flat surface 82 is slightly greater than the outer diameter of the ultrasonic transducer 12 housed in the lower case 21 of the ultrasonic-wave transmitter/receiver 10. The tip region of the convex surface 83 (including the vertex P1 of the acoustic lens 81) is spherical, and the convex surface 83, except for the tip region, is inclined. The entire spherical surface forming the convex surface 83 and a part of the inclined surface forming the convex surface 83 protrude downward from the bottom surface 61a of the holding member 61. A part of the inclined surface is supported by the opening end on the side of the upper surface 61b of the fitting hole 66. Further, the amount of deviation between the central axis O1 (the axis passing through the vertex P1) of the acoustic lens 81 and the central axis O2 of the ultrasonic-wave transmitter/receiver 10 is 2% or less of the external dimension of the ultrasonic-wave transmitter/receiver 10 (e.g., 0% for the present embodiment). If the amount of deviation is more than 2%, the center of gravity will be biased, and the holding member 61, the ultrasonic-wave transmitter/receiver 10, and the acoustic lens 81 will be tilted. In that case, there is a risk that the ultrasonic waves will not travel directly downward.

As shown in FIG. 2, the holding recess 65 of the holding member 61 holds the acoustic lens 81 on the lower side and accommodates and holds the ultrasonic-wave transmitter/receiver 10 on the upper side. The acoustic lens 81 is arranged on the side of the acoustic radiation surface 10a of the ultrasonic-wave transmitter/receiver 10 and has the function of changing the directivity characteristics of the ultrasonic waves irradiated from the acoustic radiation surface 10a.

Next, a method for using the attachment 60 for the ultrasonic-wave transmitter/receiver 10 will be described.

The ultrasonic-wave transmitter/receiver 10 of the present embodiment is used for ice fishing such as smelt fishing. In normal ice fishing, the ultrasonic-wave transmitter/receiver 10 is immersed in water while being suspended by the cable 11. Then, the fish school is detected by transmitting and receiving ultrasonic waves by the ultrasonic transducer 12 in the ultrasonic-wave transmitter/receiver 10. Specifically, first, each power of the ultrasonic-wave transmitter/receiver 10 and a liquid crystal monitor (not shown) is turned on. The liquid crystal monitor is used, for example, in a state of being held by a user. In addition, the liquid crystal monitor includes a control device (not shown) that integrally controls the entire device. The control device is composed of a well-known computer including a CPU, a ROM, a RAM, and the like.

Next, the CPU of the control device controls the ultrasonic transducer 12 in the ultrasonic transmitter/receiver 10 so as to output an oscillation signal via the cable 11 to drive the ultrasonic transducer 12. At this time, the ultrasonic transducer 12 oscillates, and ultrasonic waves are irradiated (transmitted) into the water from the ultrasonic transducer 12, i.e., from the acoustic radiation surface 10a of the ultrasonic-wave transmitter/receiver 10. Then, when the ultrasonic wave reaches the school of fish, the ultrasonic wave is reflected by the school of fish to become a reflected wave, propagates toward the ultrasonic-wave transmitter/receiver 10, and is input to (received by) the ultrasonic transducer 12. After that, the ultrasonic waves (reflected waves) received by the ultrasonic transducer 12 are converted into received signals and input to the CPU via the cable 11. At this time, the school of fish is detected. Thereafter, when the user turns off the power, the irradiation of ultrasonic waves and reception of the reflected waves are completed.

Meanwhile, there is a desire to detect a school of fish in a broader range than usual. In this case, after attaching an attachment 60 to the ultrasonic-wave transmitter/receiver 10, the attachment 60 is used in a state of being immersed in water (see FIG. 2). Specifically, first, the convex surface 83 of the acoustic lens 81 with the flat surface 82 facing upward is fitted into the fitting hole 66 provided on the holding member 61. As such, the acoustic lens 81 is held on the lower side of the holding recess 65 provided on the holding member 61. Next, the ultrasonic wave transmitter/receiver 10 with the acoustic radiation surface 10a facing downward is inserted into the holding recess 65. Then the ultrasonic-wave transmitter/receiver 10 is placed on the flat surface 82 of the acoustic lens 81 which is fitted into the fitting hole 66. As a result, the ultrasonic-wave transmitter/receiver 10 is housed and held in the holding recess 65 so that the attachment 60 is attached to the ultrasonic-wave transmitter/receiver 10.

Next, the ultrasonic-wave transmitter/receiver 10 and the attachment 60 are put into water. At this time, water enters into the holding recess 65 from the four-water supply/discharge holes 67 provided in the holding member 61, causing the water to infiltrate between the flat surface 82 of the acoustic lens 81 and the acoustic radiation surface 10a of the ultrasonic-wave transmitter/receiver 10. As a result, the flat surface 82 comes in close contact with (or acoustically couples) the acoustic radiation surface 10a via the coupling material (i.e., water). Also, the holding member 61, the acoustic lens 81, and the ultrasonic-wave transmitter/receiver 10 float on the water and are maintained horizontally due to the buoyant force acting on the buoyant body 71.

In this state, the CPU of the control device performs control to drive the ultrasonic transducer 12 in the ultrasonic-wave transmitter/receiver 10. As a result, the ultrasonic transducer 12 oscillates, and ultrasonic waves are irradiated (transmitted) from the acoustic radiation surface 10a of the ultrasonic-wave transmitter/receiver 10 into the water. The ultrasonic waves irradiated from the acoustic radiation surface 10a have a wide directional angle when passing through the acoustic lens 81. As a result, the directivity characteristics of the ultrasonic waves become wider than the original directivity characteristics, thus making it possible to detect a school of fish in a wider range than usual.

Next, a method for evaluating the attachment and its results will be described.

First, a sample for measurement was prepared as follows. An attachment provided with a conical acoustic lens (conical lens) was prepared and represented as Example 1 (see "A" in FIGS. 4 and 5). Also, an attachment provided with a hemispherical acoustic lens (hemispherical lens) was prepared and represented as Example 2 (see "." in FIGS. 4 and 5). On the other hand, an attachment without an acoustic lens was prepared and represented as a Comparative Example (see "=" in FIGS. 4 and 5).

Figure 4:
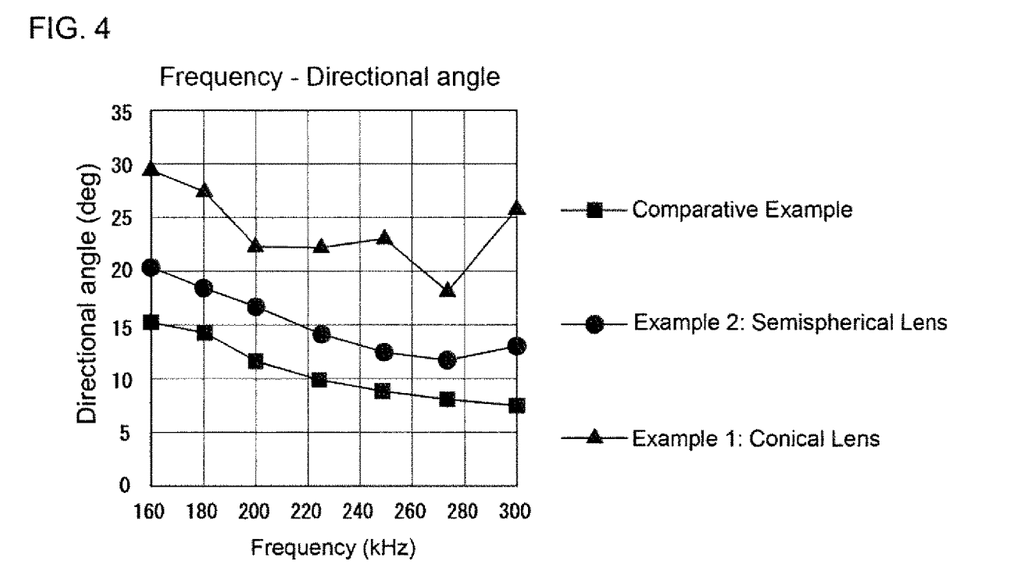
FIG. 4 is the graph showing the relationship between frequency and directional angle of Examples 1 and 2 and Comparative Example.

Next, the directivity characteristics of ultrasonic waves were verified for each of the measurement samples; Examples 1 and 2 and Comparative Example. Specifically, ultrasonic waves were irradiated from the ultrasonic transducer in the ultrasonic-wave transmitter/receiver to which the attachment was attached. Then, the directivity characteristics of the ultrasonic waves while being irradiated (transmitted) were verified. In addition, the frequency was switched in various stages between 160 kHz and 300 kHz, and ultrasonic waves were irradiated at each switched frequency. FIG. 4 is the graph showing verification results of the directivity characteristics of ultrasonic waves.

As a result, it was confirmed that in the comparative example in which the acoustic lens is not provided, the directivity characteristic having a relatively narrow directional angle is obtained at any frequency when the ultrasonic wave is irradiated from the ultrasonic transducer. On the other hand, it was confirmed in Examples 1 and 2 that when ultrasonic waves were irradiated through the acoustic lens, the directivity characteristics had a wider directional angle than the comparative example at any frequency. It was particularly confirmed that Example 1, which uses a conical acoustic lens, has a directivity characteristic with a wider directional angle than Example 2, which uses a hemispherical acoustic lens, at all frequencies.

Therefore, it was confirmed that if the ultrasonic waves are irradiated through the acoustic lens, the directional angle of the ultrasonic waves is widened, thus widening the detection range of the ultrasonic transducer. It was also confirmed that using a conical acoustic lens widens the directional angle of the ultrasonic waves, thus widening the detection range of the ultrasonic transducer.

Figure 5:
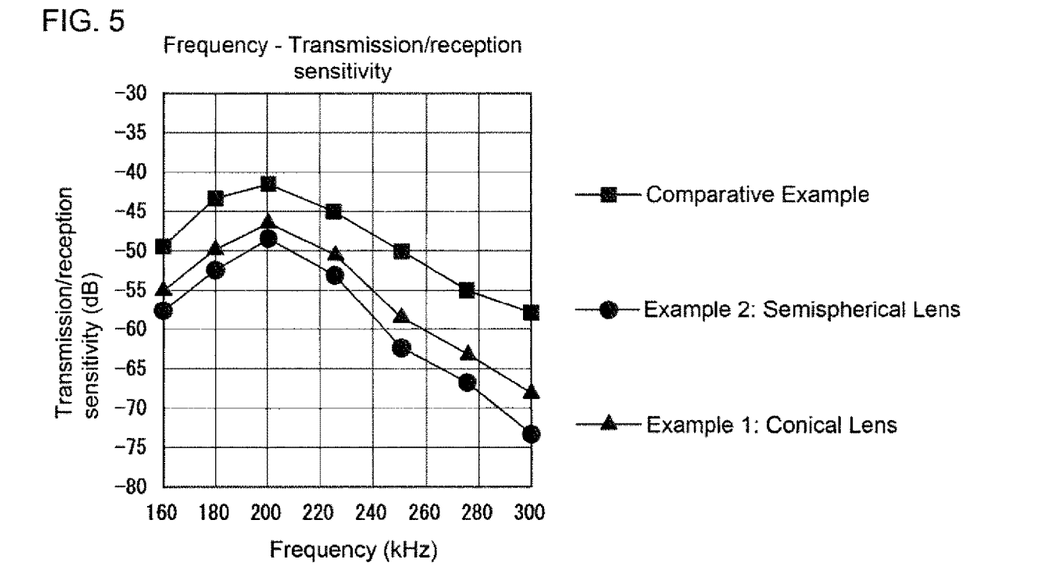
FIG. 5 is the graph showing the relationship between frequency and transmission/reception sensitivity of Examples 1 and 2 and Comparative Example.

Next, a voltage was applied to the ultrasonic transducer of each of the measurement samples; Examples 1 and 2 and Comparative Example so as to obtain transmission/reception sensitivity at a position of the radial center axis of the ultrasonic transducer and vertically beneath the ultrasonic transducer as well. Specifically, first, ultrasonic waves were perpendicularly irradiated (transmitted) to the surface of a reflector located away from the ultrasonic transducer. Also, the frequency was switched in multiple stages between 160 kHz and 300 kHz, and ultrasonic waves were irradiated at each switched frequency. The ultrasonic waves reflected on the surface of the reflector were received by the ultrasonic transducer after the lapse of a predetermined time after completion of transmission, and voltage signals were generated at both electrodes of the ultrasonic transducer. Then, the voltage amplitude during transmission and reception of the ultrasonic transducer was measured with an oscilloscope, and the transmission/reception sensitivity was calculated based on the results. The results of Examples 1 and 2 and Comparative Example are shown in FIG. 5.

As a result, it was confirmed that Examples 1 and 2 having a wide directional angle, since ultrasonic waves are irradiated through an acoustic lens, show lower transmission/reception sensitivity at all frequencies than the comparative example having a narrow directional angle due to lack of an acoustic lens. It was also confirmed in Examples 1 and 2 that Example 1 having a relatively wide directional angle due to the use of a conical acoustic lens, shows higher transmission/reception sensitivity than Example 2 having a relatively narrow directional angle due to the use of a hemispherical acoustic lens. It was also confirmed in all of Examples 1 and 2 and Comparative Example that the transmission/reception sensitivity was maximized when the frequency was 200 kHz. From the above, it was confirmed that using an acoustic lens made it possible to widen the directional angle of ultrasonic waves but lower the sensitivity. It is considered that a practical level of sensitivity can be obtained by selecting an appropriate material for forming the acoustic lens.

Therefore, according to the present embodiment, the following effects can be obtained.

(1) According to the attachment 60 for the ultrasonic-wave transmitter/receiver 10 of the present embodiment, the ultrasonic-wave transmitter/receiver 10 is held by the holding recess 65 of the holding member 61. The acoustic lens 81 is also arranged on the acoustic radiation surface 10a of the ultrasonic-wave transmitter/receiver 10 held by the holding recess 65. In this case, even if there is only one ultrasonic-wave transmitter/receiver 10, it is possible to variously change the directivity characteristics of the ultrasonic waves irradiated from the acoustic radiation surface 10a according to the situation. Specifically, holding the ultrasonic-wave transmitter/receiver 10 by the holding recess 65 makes it possible to widen the directivity characteristics (directional angle) of the ultrasonic waves while using the acoustic lens 81. On the other hand, removing the ultrasonic-wave transmitter/receiver 10 from the holding recess 65 makes it possible to restore the original directivity characteristics.

In addition, the buoyancy body 71 is provided so as to surround the holding member 61 from the outer peripheral side simply by wrapping a strip-shaped sponge around the cylindrical portion 63 of the holding member 61. For this reason, the ultrasonic-wave transmitter/receiver 10 and the acoustic lens 81 can be horizontally maintained by the buoyant force acting on the buoyant body 71 without a complicated configuration such as the horizontality-maintaining device 41 and the long screw 45 (see FIG. 6). However, the acoustic radiation surface 10a of the ultrasonic-wave transmitter/receiver 10 and the flat surface 82 of the acoustic lens 81 can be made horizontal. Moreover, even if the horizontality maintaining device 41 cannot be installed since surface 3 of the ice 1 (see FIG. 6) is not flat, it is still possible to make the acoustic radiation surface 10a and the flat surface 82 horizontal. As a result, the ultrasonic waves can be transmitted vertically downward, so the detection accuracy of the ultrasonic-wave transmitter/receiver 10 is improved.

(2) According to the present embodiment, since the buoyant body 71 is provided so as to surround the holding member 61 from the outer peripheral side, the buoyant force acts evenly on the holding member 61, and the inclination of the holding member 61 is eliminated. As a result, the balanced state of the ultrasonic-wave transmitter/receiver 10 and the acoustic lens 81 held by the holding member 61 can be quickly stabilized in water. The acoustic radiation surface 10a of the ultrasonic-wave transmitter/receiver 10 and the flat surface 82 of the acoustic lens 81 securely become horizontal, thus making it possible to easily improve detection accuracy of the ultrasonic-wave transmitter/receiver 10.

(3) According to the present embodiment, the upper case 22 constituting the upper half of a case 13 is shaped not to get caught, and a groove 25 formed in the lower case 21 constituting the lower half of the case 13 is shaped not to protrude from 21. Therefore, the fishing line is less likely to get entangled in the case 13, particularly during normal ice fishing.

(4) According to the present embodiment, since the conical acoustic lens 81 is used as a member for changing the directivity characteristics of ultrasonic waves, it is possible to make the directional angle wider than the case where e.g., a hemispherical acoustic lens is used. (See FIG. 4). If the acoustic lens 81 is simply conical, there is a problem that the sensitivity, at a position of the center axis O1 of the acoustic lens 81 and vertically beneath the acoustic lens 81, is lowered. Moreover, since it is difficult to precisely form the tip of the cone, there is another problem that variation in quality increases. Therefore, according to the present embodiment, all the above problems can be resolved since the tip region of the convex surface 83 of the acoustic lens 81 is spherical.

Second Embodiment

A second embodiment embodying the present invention will be described below with reference to the drawings. The description here will focus on the parts different from the first embodiment. This embodiment differs from the first embodiment with respect to the structure of the attachment.

Figure 6:
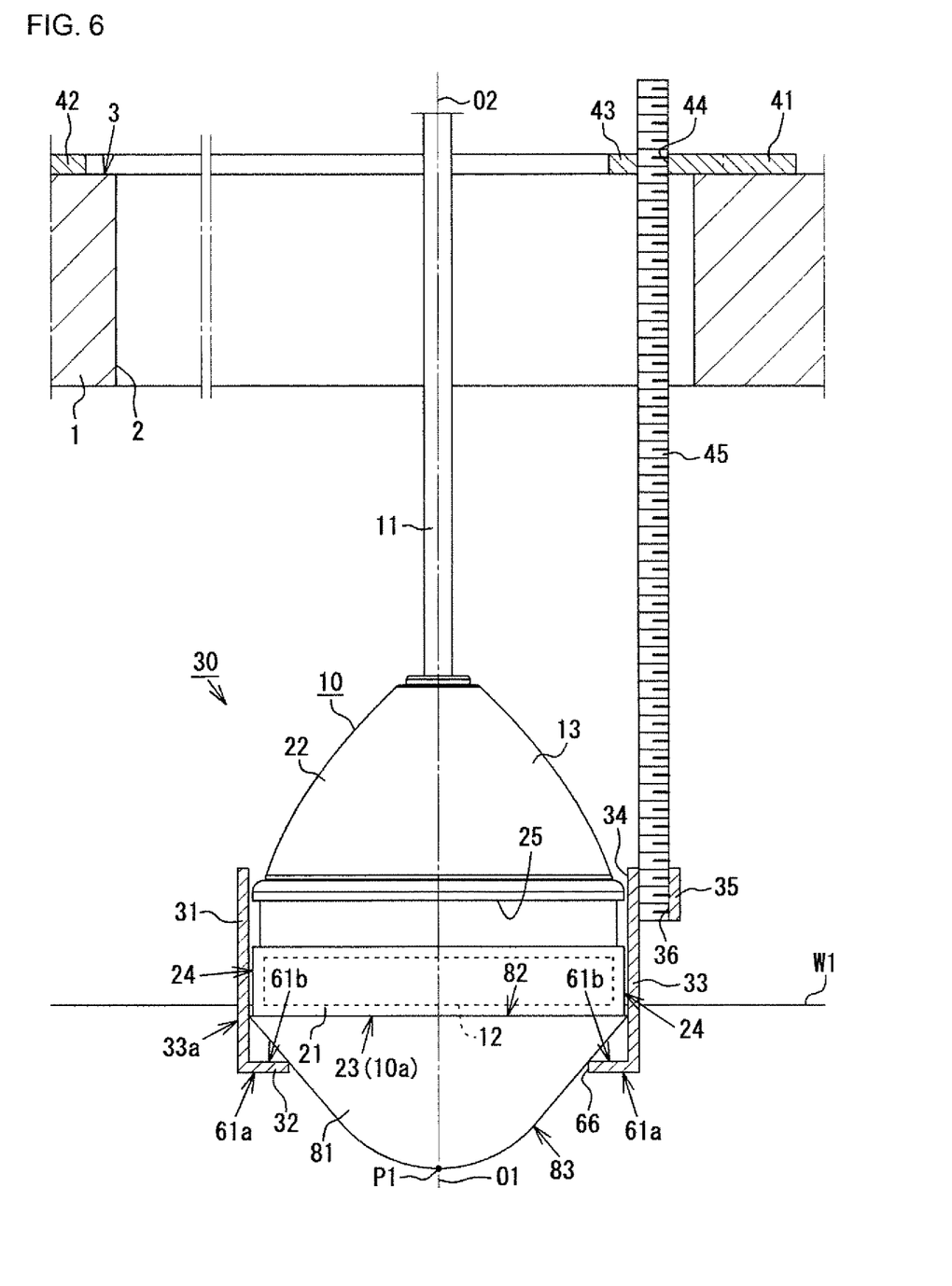
FIG. 6 is the cross-sectional view showing an attachment for an ultrasonic-wave transmitter/receiver according to the second embodiment.
Figure 7:
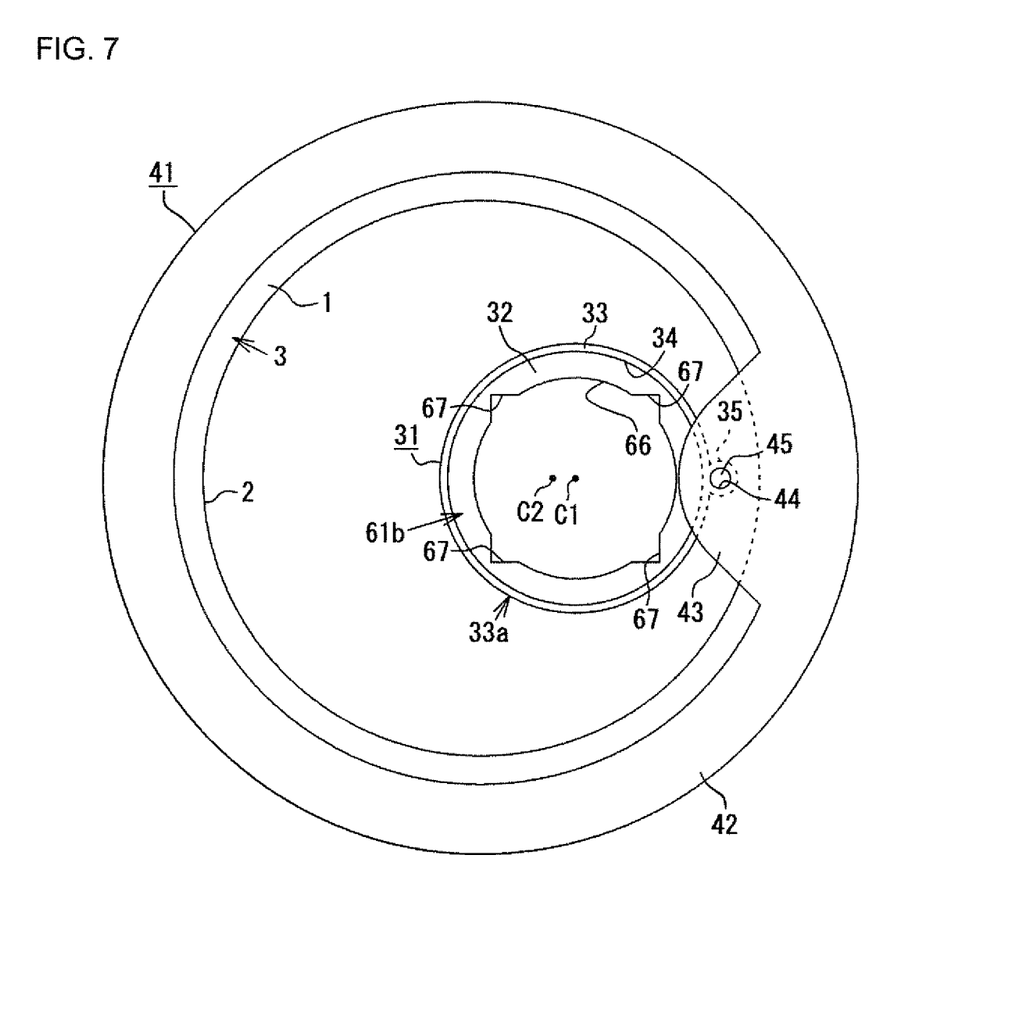
FIG. 7 is the plan view showing the positional relationship between the holding member and the horizontality-maintaining device according to the second embodiment.

Specifically, as shown in FIG. 6, the attachment 30 of the present embodiment includes an acoustic lens 81, a holding member 31, and a horizontality-maintaining device 41 (horizontality-maintaining means). As shown in FIGS. 6 and 7, the holding member 31 is a substantially cylindrical member made of a resin material and is formed into a cup shape with a bottom portion 32 and a cylindrical portion 33. A space formed by the bottom portion 32 and the cylindrical portion 33 serves as a holding recess 34 that detachably holds the ultrasonic-wave transmitter/receiver 10. A substantially cylindrical projecting portion 35 extending in the height direction of the cylindrical portion 33 is projected from the outer wall surface 33a of the cylindrical portion 33, and a screw hole 36 is provided on the projecting portion 35.

Also, the horizontality maintaining device 41 is a device for keeping the holding member 31, the ultrasonic-wave transmitter/receiver 10 and the acoustic lens 81. The horizontality-maintaining device 41 is installed at the opening part of the circular hole 2 provided in the ice 1 (see FIG. 6). The horizontality-maintaining device 41 is a plate-like member composed of a substantially annular frame body 42 that contacts the surface 3 of the ice 1 and a projecting body 43 that projects on the inner peripheral side of the frame body 42. Also, a screw insertion hole 44 is provided on the projecting body 43. Furthermore, as shown in FIG. 7, a long screw 45 (rod-shaped member) that connects a horizontality-maintaining device 41 to the holding member 31 is arranged at a position (here, i.e., where the projecting body 43 is located) that deviates from the center C1 of the fitting hole 66 and from the center C2 of the frame body 42. The lower end of the long screw 45 is screwed into the screw hole 36 of the projecting portion 35. At the same time, the upper end of the long screw 45 is screwed into and inserted into the screw insertion hole 44 of the projecting body 43 so that the holding member 31, the ultrasonic-wave transmitter/receiver 10, and the acoustic lens 81 are horizontally maintained. Since the holding member 31 is arranged inside the frame body 42 in a plan view, the ultrasonic-wave transmitter/receiver 10 and the acoustic lens 81 held by the holding member 31 are also arranged inside the frame body 42.

Next, a method for using the attachment 30 will be described.

In normal ice fishing, the ultrasonic-wave transmitter/receiver 10 is immersed in water while being suspended by the cable 11. Schools of fish are detected by transmission and reception of ultrasonic waves by the ultrasonic transducer 12 in the ultrasonic-wave transmitter/receiver 10.

Incidentally, there is also a demand for detecting schools of fish in a wider range than usual by fixing an attachment 30 to the ultrasonic-wave transmitter/receiver 10 and using such an attachment 30 in a state of being immersed in water (see FIG. 6). Specifically, first, the convex surface 83 of the acoustic lens 81 with the flat surface 82 facing upward is fitted into the fitting hole 66 provided on the holding member 31. As such, the acoustic lens 81 is held on the lower side of the holding recess 34 of the holding member 31. Next, the ultrasonic-wave transmitter/receiver 10 with the acoustic radiation surface 10a facing downward is inserted into the holding recess 34. Then, the ultrasonic-wave transmitter/receiver 10 is placed on the flat surface 82 of the acoustic lens 81 that is fitted into the fitting hole 66. As a result, the ultrasonic-wave transmitter/receiver 10 is housed and held in the holding recess 34 so that the attachment 30 is attached to the ultrasonic-wave transmitter/receiver 10.

Next, horizontality-maintaining device 41 is installed at the opening part of hole 2 provided in the ice 1, and the ultrasonic-wave transmitter/receiver 10 and the attachment 30 are put into the water. At this time, water enters the holding recess 34 through the four-water supply/discharge holes 67 provided on the holding member 31, then the water infiltrates between the flat surface 82 of the acoustic lens 81 and the acoustic radiation surface 10a of the ultrasonic transducer 10. As a result, the flat surface 82 is in close contact (acoustically coupled) to the acoustic radiation surface 10a via the coupling material (e.g., water, here in this embodiment).

In this state, the ultrasonic transducer 12 in the ultrasonic-wave transmitter/receiver 10 is driven to irradiate (transmit) ultrasonic waves from the acoustic radiation surface 10a into the water. The ultrasonic waves irradiated from the acoustic radiation surface 10a have a wide directional angle when passing through the acoustic lens 81. As a result, the directivity characteristics of the ultrasonic waves become wider than the original directivity characteristics, thus making it possible to detect a school of fish in a wider range than usual.

Therefore, according to this embodiment, the following effects can be obtained.

(5) According to the attachment 30 for the ultrasonic wave transmitter/receiver 10 of the present embodiment, the horizontality maintaining device 41 is simply installed at the opening of the hole 2 provided in the ice 1, which makes it possible to easily keep the horizontal state of the ultrasonic-wave transmitter/receiver 10 and the acoustic lens 81 held by the holding member 31. In addition, since the horizontality-maintaining device 41 is supported by the solid ice 1, the horizontal state of the ultrasonic-wave transmitter/receiver 10 and the acoustic lens 81 can be stably maintained.

(6) According to the present embodiment, since the holding member 31 is arranged inside the frame body 42, the ultrasonic-wave transmitter/receiver 10 (ultrasonic transducer 12) held by the holding member 31 is also arranged inside the frame body 42, that is, closer to the center of the hole 2 provided in the ice 1. Thereby, fish detection can be appropriately performed directly under the hole 2.

(7) According to the present embodiment, the long screw 45 connecting the horizontality-maintaining device 41 to the holding member 31 is arranged at a position that deviates from the center C2 of the frame body 42. Therefore, the long screw does not hinder the ultrasonic-wave transmitter/receiver 10 from being attached to and detached from the holding member 31. Further, the long screw 45 is less likely to be entangled with the cable 11, fishing line, or the like for suspending the ultrasonic transducer 10.

Also, each of the above embodiments may be modified as follows.

The acoustic lens 81 according to the above embodiments may be selected from among various types of acoustic lenses that differ from each other in at least one of the dimensions (e.g., the diameter of the flat surface, the height from the center to the vertex of the flat surface, etc.) and the shapes (e.g., the condition of the convex surface, etc.).

Figure 8:
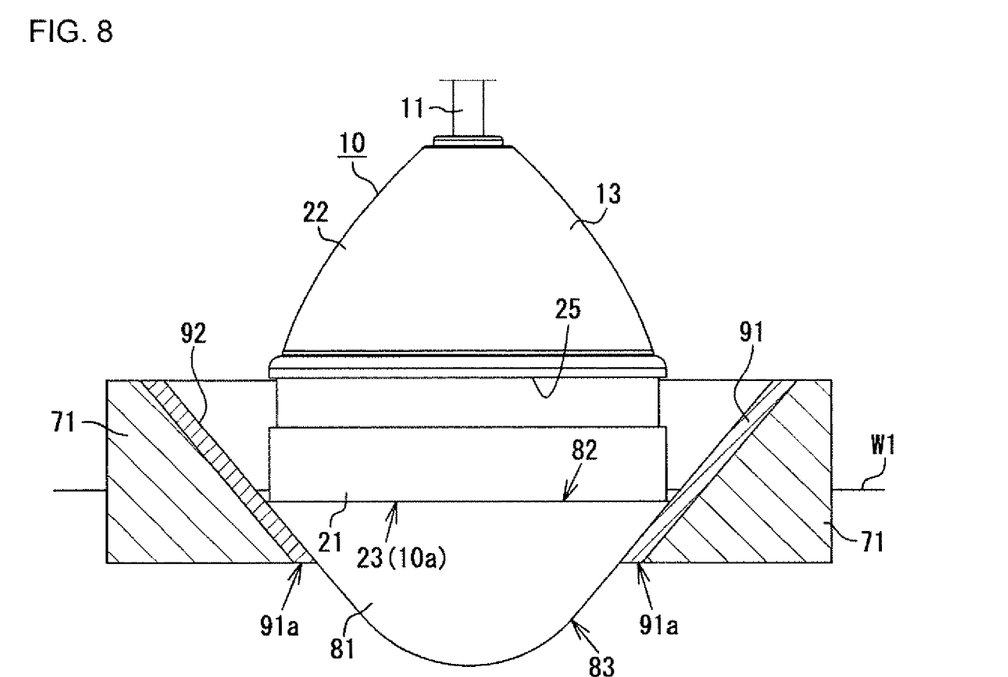
FIG. 8 is the sectional view showing an attachment for an ultrasonic-wave transmitter/receiver according to another embodiment.

As shown in FIG. 8, a fitting hole 92 is provided on the holding member 91 so as to fit the convex surface 83 of the acoustic lens 81 with the flat surface 82 facing up into the holding member 91 so that it protrudes downward from the bottom surface 91a of the holding member 91. The fitting hole 92 may be formed such that the inner diameter gradually increases as it goes upward. With this configuration, the acoustic lens 81 is held by the holding member 91 in a state where a part of the inclined surface forming the convex surface 83 is in surface contact with the inner side surface of the fitting hole 92 so that the ultrasonic-wave transmitter/receiver 10 can be easily placed into the fitting hole 92.

According to the above embodiments, the acoustic lens 81 is placed in the holding recesses 34, 65 of the holding members 31, 61. However, it is preferably fixed to the holding members 31, 61 by fitting or gluing. Suppose it is not fixed to the holding members 31, 61. In that case, when the ultrasonic-wave transmitter/receiver 10 is lifted, the attached acoustic lens 81 will also be lifted together with the ultrasonic-wave transmitter/receiver 10. Thus there is a risk of dropping into the water.

Figure 9:
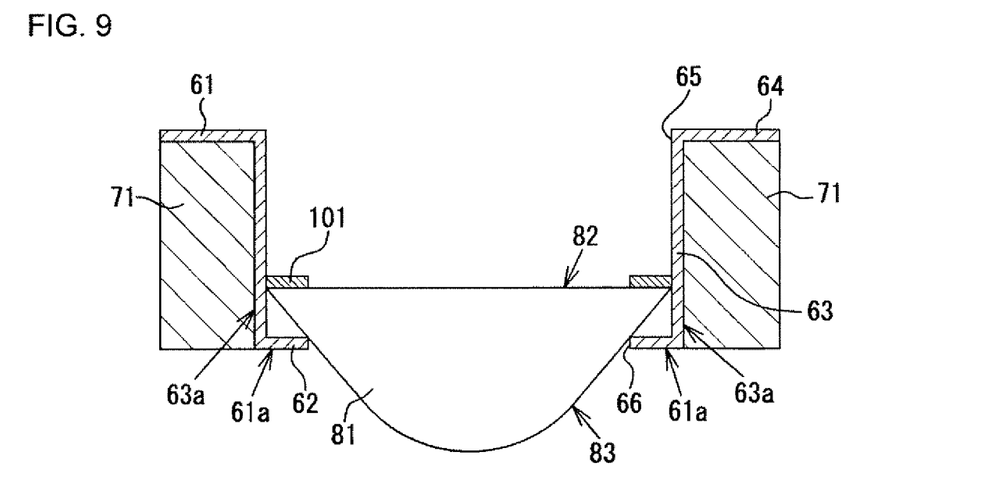
FIG. 9 is the sectional view showing an attachment for an ultrasonic transducer according to yet another embodiment.

Also, as a fixing mode of the acoustic lens 81, for example, as shown in FIG. 9, an annular mounting fixture 101 may be fixed on the inner peripheral side of the holding recess 65 of the holding member 61 so that the mounting fixture 101 presses the outer peripheral surface of the flat surface 82 of the acoustic lens 81 fitted into the fitting hole 66. In this way, the acoustic lens 81 is firmly fixed while being inserted between the holding member 61 and the mounting fixture 101 so that the acoustic lens 81 can be securely held and fixed.

Further, as shown in FIG. 10, it is also possible to penetrate a screw 114 (fastening member) through a through-hole 113 provided on a cylindrical portion 112 of a holding member 111, to let the tip of the screw 114 passing through the through hole 113 fit into a groove 25 formed on the outer peripheral surface 24 of the ultrasonic wave transmitter/receiver 10. In this case, the screw 114 fitted into the groove 25 makes it possible to prevent the case 13 (ultrasonic-wave transmitter/receiver 10) and the acoustic lens 81 located on its lower side from coming off, thus making it possible to securely hold and fix the ultrasonic-wave transmitter/receiver 10 and the acoustic lens 81. Instead of using the screw 114, a permanent magnet may be provided in the groove 25, and a magnetic material such as a metal plate or the like may be provided on the cylindrical portion 112, at a position facing the permanent magnet. Even in this case, the permanent magnet and the metal plate are closely attracted to each other so as to prevent the case 13 and the acoustic lens 81 from coming off, thus making it possible to securely fix and hold the ultrasonic-wave transmitter/receiver 10 and the acoustic lens 81. In addition, if the screw 114 is not used, the through-hole 113 and the groove 25 may not be provided, either.

Figure 11:
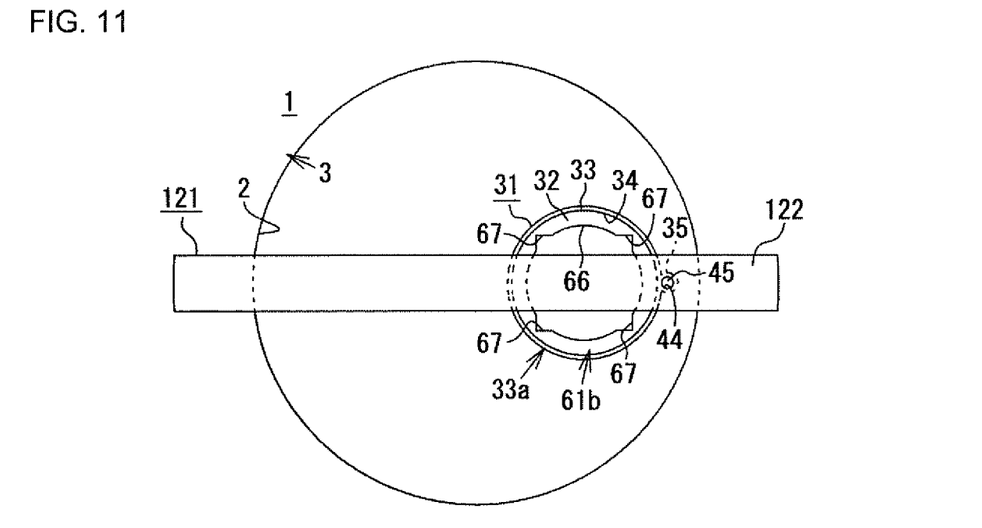
FIG. 11 is the plan view showing the positional relationship between the holding member and the horizontality-maintaining device according to another embodiment.

According to the above second embodiment, the horizontality-maintaining device 41 is composed of the substantially annular frame body 42. However, it may be composed of a frame body of other shapes. For example, as shown in FIG. 11, the horizontality-maintaining device 121 may consist of one belt-shaped member 122. A screw insertion hole 44 for screwing and inserting the upper-end portion of the long screw 45 is provided on the belt-shaped member 122.

Figure 12:
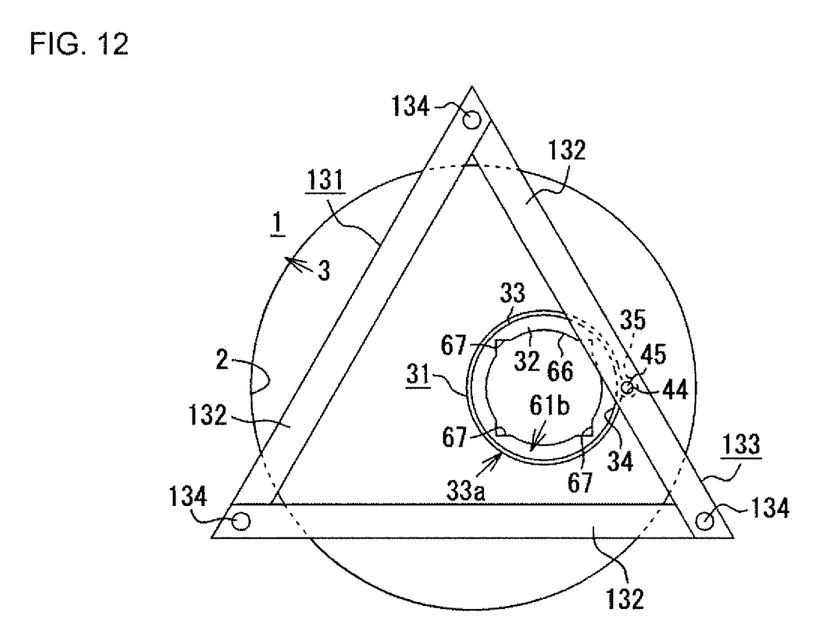
FIG. 12 is the plan view showing the positional relationship between the holding member and the horizontality-maintaining device according to yet another embodiment.

Also, as shown in FIG. 12, the horizontality-maintaining device 131 may consist of a triangular frame 133 having a plurality of (here, three) sides 132. Adjacent side portions 132 are connected to each other via a shaft 134. A screw insertion hole 44 for screwing and inserting the upper end of the long screw 45 is provided in the central area of one side portion 132. In this way, the horizontality maintaining device 131 can be stably attached to the opening portion of the hole 2 provided in the ice 1, compared to the case where the horizontality maintaining device 131 consists of, for example, one piece of the belt-shaped member 122 (see FIG. 11).

Figure 13A:
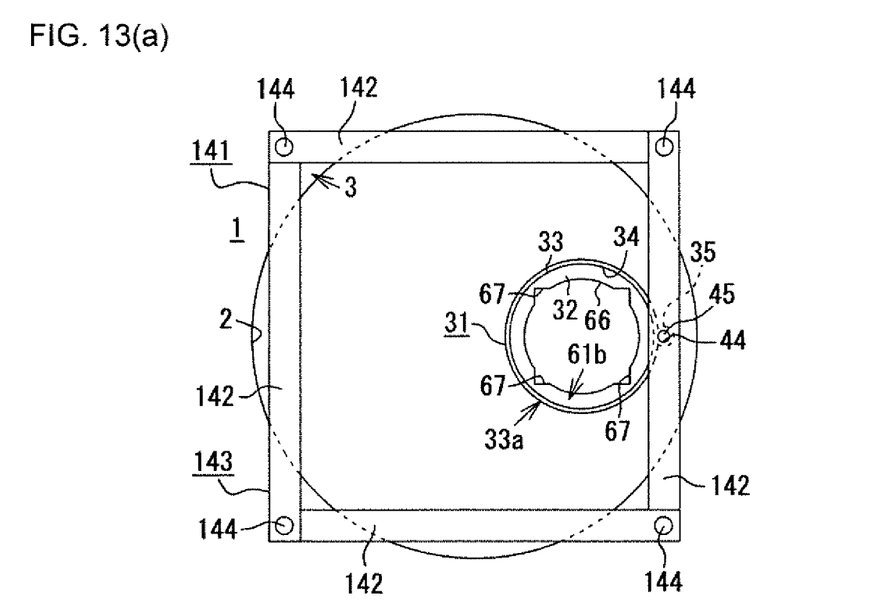

Further, as shown in FIG. 13(a), the horizontality maintaining device 141 may be composed of a square-shaped frame body 143 having an even number of sides 142 of 4 or more (here, 4), and is foldable. The length of the diagonal line of the frame body 143 is greater than the inner diameter of the hole 2 provided in the ice 1, and the lengths of the sides 142 are equal to each other. A screw insertion hole 44 for screwing and inserting the upper end of the long screw 45 is provided in the central area of the side portion 142.

Figure 13B:
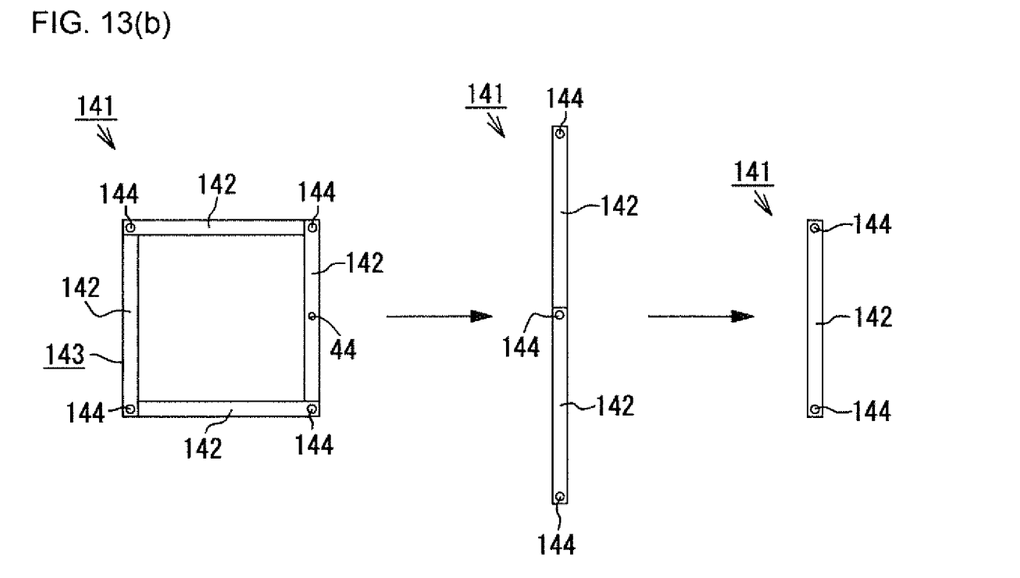

In this case, for example, as shown in FIG. 13(b), if the adjacent sides 142 are rotated so as overlap each other via the two shafts 144 located on the diagonal line of the square frame body 143, the frame body 143 is folded into a rod shape. In addition, if the sides 142 located on both sides of the shaft 144 are rotated so as to overlap each other with respect to the center of the shaft 144 located in the center of the frame body 143 that is folded into a rod shape, the frame body 143 is folded into a half-length. As a result, the horizontality-maintaining device 141 (frame body 143) is folded compactly, which makes it easy to carry the horizontality-maintaining device 141.

According to the second embodiment, the long screw 45 is used as a rod-shaped member, but a metal rod or the like without a thread groove may be used as the rod-shaped member.

According to the embodiments described above, respectively, four water supply/discharge holes 67 are provided on the bottoms 32, 62 of the holding members 31, 61, but it is also possible to provide five water supply/discharge holes 67 or more, yet three water supply/discharge holes 67 or less. Otherwise, no supply/discharge hole 67 may be required. Also, the water supply/discharge hole 67 is formed by widening a part of the fitting hole 66, but it may be independently formed from such a fitting hole 66.

According to the embodiments described above, respectively, the case 13 of the ultrasonic-wave transmitter/receiver 10 is formed by joining the upper case 22 and the lower case 21. However, it may be integrally formed.

According to the embodiments described above, respectively, the attachments 30 and 60 are used for a fish finder, but they may be used for a measuring device such as a depth sounder for measuring the water depth.

Besides the technical ideas of the present invention, as described above, other technical ideas to be understood are described hereinafter.

(1) An attachment for an ultrasonic-wave transmitter/receiver according to any one of the first to 10th aspects of the present invention, characterized in that the amount of deviation between the central axis of the acoustic lens and the central axis of the ultrasonic-wave transmitter/receiver is 2% or less of the outer diameter of the ultrasonic-wave transmitter/receiver.

(2) An attachment for an ultrasonic-wave transmitter/receiver according to the fifth aspect of the present invention, characterized in that the buoyant body has buoyancy such that the water surface reaches the flat surface of the acoustic lens in a state where the ultrasonic-wave transmitter/receiver is not being held by the holding member.

In this way, when the ultrasonic-wave transmitter/receiver is held by the holding member, the acoustic radiation surface of the ultrasonic-wave transmitter/receiver is securely brought into contact with liquid (in this case, with water). Therefore, an air pocket does not hinder ultrasonic wave irradiation.

DESCRIPTION OF THE REFERENCE NUMERALS

1: Ice
2: Hole provided in the ice
10: Ultrasonic-wave transmitter/receiver
10a: Acoustic radiation surface
11: Cable
12: Ultrasonic transducer
23: Bottom surface of the ultrasonic wave transmitter/receiver
24: Outer peripheral surface of the ultrasonic-wave transmitter/receiver
25: Groove
30, 60: Attachment
31, 61, 91, 111: Holding member
32, 62: Bottom portion of the holding member
41, 121, 131, 141: Horizontality-maintaining device as the horizontality-maintaining means
42, 133, 143: Frame body
45: Long screw as the rod-shaped member
61a, 91a: Bottom surface of the holding member
66: Fitting hole
67: Water supply/discharge hole
71: Buoyant body as the horizontality-maintaining means
81: Acoustic lens
82: Flat surface
83: Convex surface
101: Mounting fixture
114: Screw as the fastening member
142: Side portion
C2: Center of the frame body

The invention claimed is:

1. An attachment to be attached to an ultrasonic-wave transmitter/receiver for a fish finder, which is suspended from a cable, housing a molded ultrasonic transducer for transmitting and receiving ultrasonic waves with the bottom surface as an acoustic radiation surface characterized in comprising:

an acoustic lens having a flat surface and a convex surface located on the opposite side;
a holding member to hold the acoustic lens with the flat surface facing upward and to detachably hold the ultrasonic-wave transmitter/receiver so that the acoustic radiation surface is acoustically connected to the flat surface of the acoustic lens;
a horizontality-maintaining means to maintain the ultrasonic-wave transmitter/receiver and the acoustic lens horizontally,
a fitting hole provided on the bottom portion of the holding member so that a convex surface side of the acoustic lens with the flat surface facing upward is fitted thereinto and protruded downward from a bottom surface of the holding member; and
a water supply/discharge hole for supplying water into the holding member and discharging water from the holding member,
wherein the water supply/discharge hole is formed by widening a part of the fitting hole to form a gap to acoustically couple the acoustic radiation surface of the ultrasonic-wave transmitter/receiver to the flat surface of the acoustic lens via water; and wherein the horizontality-maintaining means is provided so as to surround the holding member from the outer peripheral side, which is made of a material having a specific gravity smaller than that of water and is a buoyant body that horizontally maintains the ultrasonic-wave transmitter/receiver and the acoustic lens by a buoyancy acting on itself.

2. The attachment for an ultrasonic-wave transmitter/receiver according to claim 1, characterized in that the acoustic lens is detachably held to the holding member and is selected from among various types of acoustic lenses having at least either of dimensions or shape different from each other.

3. The attachment for an ultrasonic-wave transmitter/receiver according to claim 1, wherein the fitting hole has a shape of which an inner diameter thereof gradually increases as it goes up.

4. The attachment for an ultrasonic-wave transmitter/receiver according to claim 1, comprising a mounting fixture which is fixed on an inner peripheral surface of the holding member to press the flat surface of the acoustic lens fitted into the fitting hole.

5. The attachment for an ultrasonic-wave transmitter/receiver according to claim 1, characterized in that a groove extending in a circumferential direction of the ultrasonic-wave transmitter/receiver is formed on an outer peripheral surface of the ultrasonic-wave transmitter/receiver, wherein a fastening member passing through the holding member is fitted into the groove.

* * * * *